Sept. 7, 1943.    E. P. TOWNSLEY    2,328,694
WELDING FIXTURE
Filed April 9, 1942    2 Sheets-Sheet 1
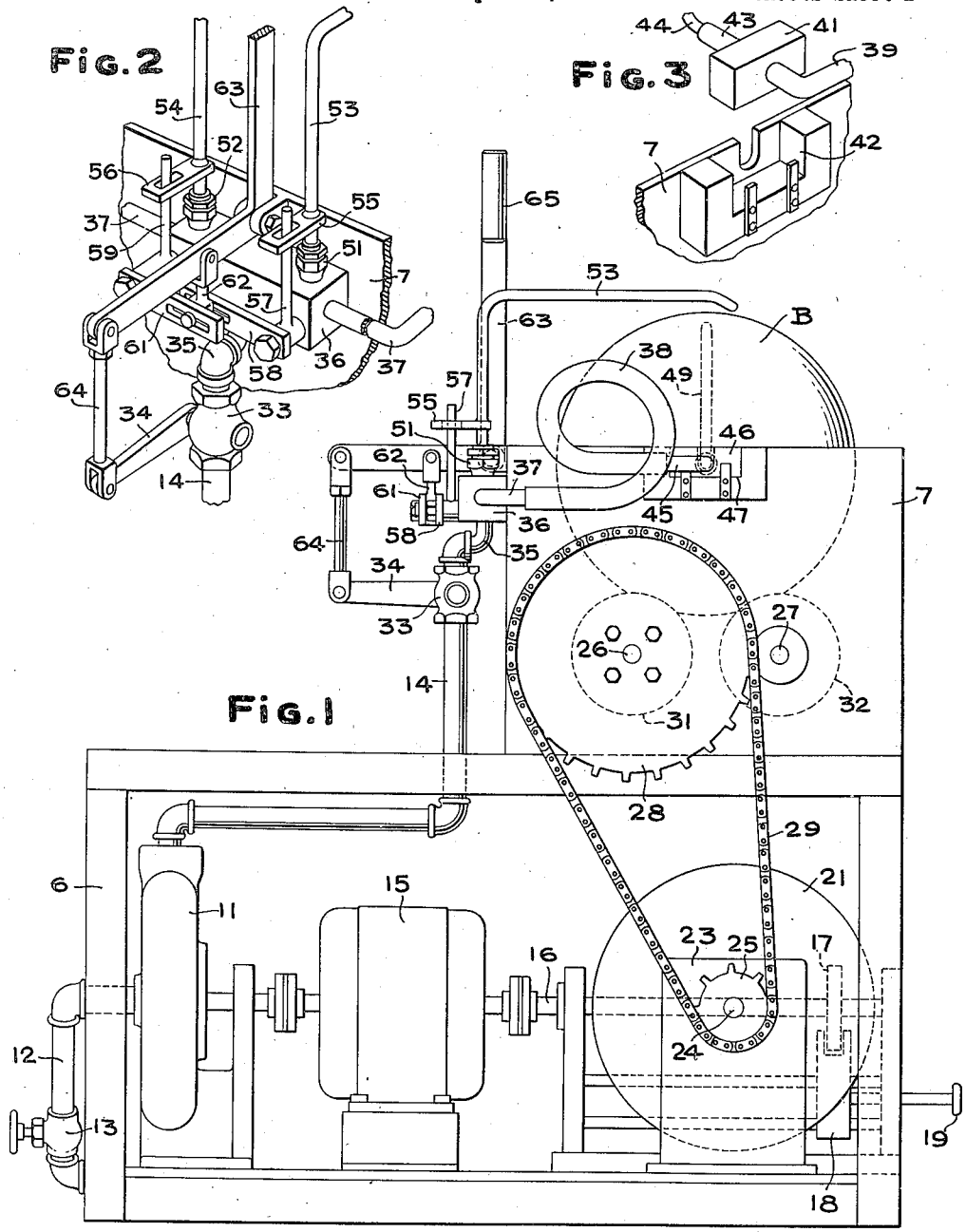
Inventor
Elias P. Townsley
By
Daly &...
Attorneys

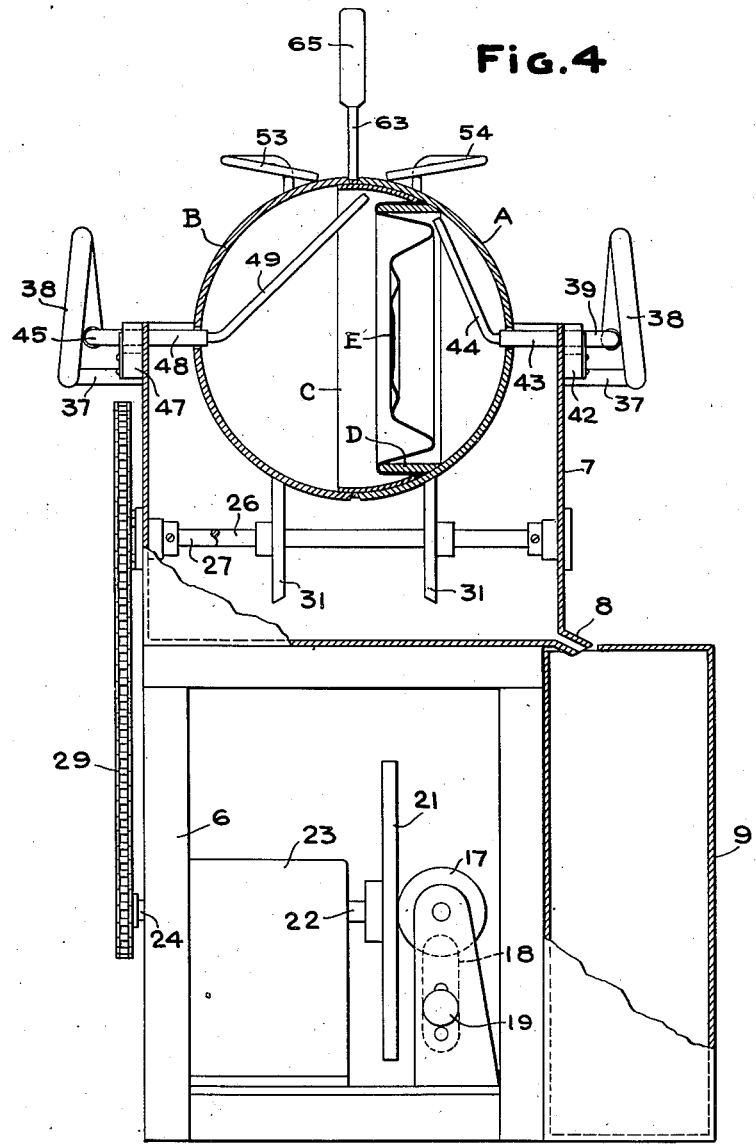

Patented Sept. 7, 1943

2,328,694

UNITED STATES PATENT OFFICE 2,328,694

WELDING FIXTURE

Elias P. Townsley, Chicago, Ill., assignor to Hydraulic Controls, Inc., a corporation of Illinois Application April 9, 1942, Serial No. 438,317

2 Claims. (Cl. 113—59)

This invention relates to welding and particularly to a welding fixture for welding together the halves of a spherical hydraulic accumulator.

Hydraulic accumulators of the gas cushion type require the use of a flexible diaphragm or septum to separate the liquid and gas spaces. Otherwise, gas will become occluded in the liquid with detrimental results occasioned by loss of the gas which forms the cushion, and by development of undesired elastic characteristics in the hydraulic circuit, as an incident to circulation of gas with the liquid or the trapping of gas in pockets in the circuit (or both).

High pressure accumulators are coming into extensive use on various vehicles, notably airplanes and military tanks, and changes of position, and violent vibration both increase the difficulty above outlined. Consequently the separating diaphragm is indispensible. It must be of flexible material such as some oil resising rubber-like material (for example the synthetic plastic known by the trade name "neoprene"). It must be impervious to the hydraulic liquid, but it is not normally subjected to heavy pressure differentials, and so may be thin. The bursting stresses in the accumulator shell at pressures of the order of 3000 pounds per square inch are large, weight must be kept at a minimum, and only a spherical shell with a welded joint is acceptable for this service.

The problem is to weld the halves of the shell together, with the diaphragm already sealed to one-half of the shell. Temperatures far below welding temperature will destroy any available diaphragm material.

The invention provides means for manipulating the shell during the formation of the weld, and for cooling the diaphragm and all metal adjacent the diaphragm so that safe temperatures at the diaphragm will not be exceeded. Specifically, the invention contemplates progressive welding with spray cooling on both sides of the line of weld at and near the welding point.

Considering the weld line as at the "equator," the accumulator must have fittings welded to the shell at the "poles." The openings for these fittings, which are welded on later, give access to the interior of the shell at opposite sides of the diaphragm. A motor driven support rotates the shell about a horizontal axis passing through the poles. Spray nozzles inserted through the openings direct water against both sides of the confining means for the margin of the diaphragm. Other nozzles spray water on the exterior of the shell at each side of the equatorial weld line. All these sprays impinge in an area adjacent the weld point.

A preferred embodiment of the invention will now be described by reference to the accompanying drawings, in which:

Fig. 1 is a side elevation of the complete device.

Fig. 2 is a fragmentary perspective of the spray control valve, with connected shifting mechanism for the outside spray nozzles.

Fig. 3 is a fragmentary perspective of the mount for the inside spray nozzles.

Fig. 4 is a view, partly in section, of the device as seen from the right hand side in Fig. 1.

A base frame 6 which may be constructed of any suitable material and whose form is sufficiently indicated in the drawings supports the tank 7. This serves to collect the water used in cooling. This water drains through a spout 8 into a reservoir 9 which is shown resting on the floor alongside the frame 6.

Mounted within the base 6 is a centrifugal pump 11 which draws its supply of water through the pipe 12 and the normally open stop valve 13 from the reservoir 9, and delivers it to the delivery pipe 14. The pump 11 is driven by a suitable motor such as the electric motor 15 shown in the drawings.

This motor is mounted in the frame 6 and its shaft is connected at opposite ends to the pump 11 as already suggested and to a shaft 16 on which is splined the axially shiftable roller 17. The roller 17 is shiftable by a fork 18 which is actuated by a knob 19 and coacts with a disc 21, the roller 17 and disc 21 forming a familiar variable speed driving mechanism of the friction type. The shaft 22, on which the disc 21 is mounted, drives a speed reducing train in the housing 23. The driven shaft of this train is indicated at 24 and carries a sprocket 25 for the chain drive to the mechanism which supports and drives the shell during the welding operation.

Parts 17 to 21 typify any suitable means for reducing the angular velocity from that of the motor 15 to the comparatively low rate required for the shaft 24. The parts 17 and 21 permit the limited adjustment of speed required to meet minor variations in the welding conditions. The speed reducer 23 is a standard article of commerce for which no novelty is claimed. Consequently its internal construction is not indicated.

Extending across the tank 7 parallel with each other are two horizontal shafts 26 and 27. The shaft 26 carries a relatively large sprocket 28 which is driven by the sprocket 25 through the chain 29. Fixed on the shaft 26 are two discs 31 and fixed on the shaft 27 are two similar discs 32. These four discs are aligned in pairs and serve as means to support the accumulator shell during welding. The discs 31 drive the shell in its rotary motion while the discs 32 are idlers having supporting and guiding functions.

The complete receiver is a sphere, the need for this form being imposed by the demand for a pressure vessel of minimum weight, adequate strength and stable form.

A brief description of this receiver in the condition which it has reached just prior to the welding operation will assist in the understanding of the device. The receiver shell comprises a lower half A and an upper half B which make a butt-joint, the joint being covered by an internal lap strip C. Before the parts A, B and C are assembled, a seat ring D is welded to the lower half A. This provides an annular confining groove or seat at the juncture of the outer wall of the ring D and the inner wall of the shell portion A. A diaphragm E of "neoprene" or equivalent material, whose form is clearly shown in Fig. 4, is mounted so that its beaded peripheral portion extends over the ring D and enters the seat or groove already described.

The next step is to press the lap ring C into the portion A so that it clamps the marginal portion of the diaphragm E into the seat, compressing the peripheral bead. The ring C is pressed in with sufficient force to ensure a tight joint. The ring C is then tack-welded to the portion A at a number of points, the tack welds being simply to retain the ring in its clamping position. When this operation has been completed, the two halves A and B of the shell are assembled, tack-welded to hold them together, and mounted on the rollers 31, 32 in the position shown in Fig. 4.

Reverting now to the description of the welding fixture, the delivery pipe 14 leads to a stop valve 33 which has an actuating arm 34. This valve delivers through a connection 35 to a manifold 36. Leading from the ends of the manifold 36 are elbows 37, to which are attached the coiled flexible hose 38. There are two such hose connections, as clearly shown in Fig. 4. The hose connection at the right hand side of the device, as viewed in Fig. 4, leads to an elbow nipple 39 which is mounted in a removable block 41. This block may be removably engaged in a socket 42 mounted on the side of the tank 7 in such a position that the end 43 of the elbow nipple 39 will extend through one of the polar openings in the shell, that is, the opening in the portion A. This end 43 carries an upwardly directed nozzle 44 which when active directs water against the interior of the ring D near the top of the shell as it rests on the rollers 31 and 32. The form of the block 41 and the socket 42 in which it is mounted are subject to modification and are shown in detail in Fig. 3.

The hose 38 at the left of Fig. 4 leads to a similar removable nozzle structure. There is an angle nipple 45, block 46 and socket 47. The end of the elbow nipple 45, indicated at 48, is aligned with and enters the polar hole in the section B and carries the nozzle 49 which discharges against the ring C and toward its line of contact with the margin of the diaphragm E. It will be observed that the blocks 41, 46 are simply convenient means for permitting the nozzles to be inserted while the shell is being placed on the rollers 31, 32.

Extending upward from the manifold 36 are two spaced sockets 51 and 52 which form the receiving sockets for the packed swivel joints of two nozzles 53 and 54. These nozzles are given the bent configuration best shown in Fig. 4 so that they are directed obliquely toward each other and toward the observer in Fig. 4 (i. e., toward the right in Fig. 1).

The purpose of swiveling the nozzles is to permit their ends to be swung apart so that the shell can be placed and removed without interference. A single actuator is provided to swing the nozzles toward each other and simultaneously open the valve 33. This mechanism involves arms 55 and 56 on the nozzles, each of which is engaged by one arm of a corresponding bell-crank. One bell-crank comprises the arms 57 and 58 and the other the arms 59 and 61. The arms 58 and 61 project toward each other and overlap. They have each a pin and slot connection with the link 62 which is pivoted to the horizontal arm of an L-shaped actuating lever 63. The end of this horizontal arm is connected by a link 64 with the actuating arm 34 of the valve 33. At the upper end of the lever 63 is an actuating handle 65.

If the handle 65 be moved to the left with reference to Fig. 1, the nozzles 53 and 54 are swung apart, that is, 53 swings clockwise and 54 counterclockwise when viewed in plan. At the same time the valve 33 is closed, stopping the supply of water to the nozzles. Reverse movement which would occur after a shell has been placed for welding would swing the nozzles toward each other and turn on the water.

After the two halves of the shell have been assembled with the diaphragm in position, the shell is mounted on the rollers 31, 32. The internal nozzles 44 and 49 are placed. The motor 15 is started, and the roller 17 is adjusted to give the desired rate of rotation to the shell to be welded. The next step is to swing the lever 63 to the right (as viewed in Fig. 1) which properly positions the nozzles 53 and 54. Assuming that the valve 13 is open, the effect will be to deliver water in spray form adjacent the line of weld and at the top portion of the slowly rotating shell.

A continuous weld is then formed, the welding being localized at the top of the shell where the cooling action is effective. It is ordinarily necessary to make two passes completely around the circumference of the shell, which means that during the welding operation the shell makes two complete turns. The supply of water is continued as long as welding continues, and long enough thereafter to dissipate residual heat adjacent the weld.

The invention contemplates the support and rotation of the shell about an appropriate axis preferably horizontal, and the use of internal and external sprays in the general manner indicated, the nozzles for the internal sprays being inserted through the polar apertures. The internal nozzles serve as auxiliary aligning means defining the axis of rotation.

The specific mountings for internal and external nozzles which are chosen for illustration were selected because of their simplicity and the fact that they have proven satisfactory in use. They are susceptible to modification within the scope of the invention. The invention provides a simple fixture in which the shells can be continuously and rapidly welded without injury to the rather thin slack diaphragms which are used in devices of this character.

The use of internal and external sprays gives adequate cooling without adverse effect on the weld or the rate of welding. Despite the sensitive character of the diaphragm, the small clearances available, and the high temperature necessary for welding, the results obtained are uniform, and entirely adequate for commercial production.

I claim:

1. A welding fixture for guiding and protecting during fabrication a spherical shell having heat sensitive internal parts, the shell being fabricated by welding together two hemispherical components continuously along a substantially equatorial line, said hemispherical components having apertures at the poles relatively to such equatorial welds, said fixture comprising a sustaining structure; a pair of combined trunnion and nozzle units sustained by said structure, at least one of said units being readily removable, and each unit being insertable into one of said apertures to determine the axis of rotation of the shell and to deliver cooling jets against the interior of the shell adjacent the weld point; means for rotating said shell on said axis, said means being arranged to become effective by engagement with the shell when the latter is mounted on said combined units; nozzle means mounted to shift between a retracted position in which clearance is afforded for mounting and removing shells and an active position for directing cooling fluid against the shell adjacent the weld point; and means for delivering cooling fluid to said nozzle means and to said combined units.

2. A welding fixture for guiding and protecting during fabrication a spherical shell having heat sensitive internal parts, the shell being fabricated by welding together two hemispherical components continuously along a substantially equatorial line, said hemispherical components having apertures at the poles relatively to such equatorial welds, said fixture comprising a sustaining structure; a pair of combined trunnion and nozzle units sustained by said structure, at least one of said units being readily removable, and each unit being insertable into one of said apertures to determine the axis of rotation of the shell and to deliver cooling jets against the interior of the shell adjacent the weld point; means for rotating said shell on said axis, said means being arranged to become effective by engagement with the shell when the latter is mounted on said combined units; nozzle means mounted to shift between a retracted position in which clearance is afforded for mounting and removing shells and an active position for directing cooling fluid against the shell adjacent the weld point; means for controlling the delivery of cooling fluid to said shifting nozzles and to the combined units; and a single actuator for shifting said shifting nozzles and for actuating said controlling means.

ELIAS P. TOWNSLEY.